United States Patent
Chopra et al.

(10) Patent No.: US 10,795,987 B2
(45) Date of Patent: Oct. 6, 2020

(54) RATE-LIMITING API CALLS FOR AN ACCOUNT IN A CUSTOMER-RELATIONSHIP-MANAGEMENT SYSTEM BASED ON PREDICTED ABUSIVE BEHAVIOR

(71) Applicant: Zendesk, Inc., San Francisco, CA (US)

(72) Inventors: Vivek Chopra, San Francisco, CA (US); Srikanth Veeraraghavan, San Francisco, CA (US); Arwen Twinkle E. Griffioen, Montmorency (AU); Hao Sun, Fremont, CA (US); David S. Liberman, San Francisco, CA (US); J. David Niergarth, Madison, WI (US); Indika D. Jayasinghe, Merced, CA (US); Lisa Friedman, San Francisco, CA (US)

(73) Assignee: Zendesk, Inc., San Francisco, CA (US)

( * ) Notice: Subject to any disclaimer, the term of this patent is extended or adjusted under 35 U.S.C. 154(b) by 209 days.

(21) Appl. No.: 15/720,319

(22) Filed: Sep. 29, 2017

(65) Prior Publication Data
US 2019/0102536 A1    Apr. 4, 2019

(51) Int. Cl.
| | | |
|---|---|---|
| *G06F 21/00* | (2013.01) | |
| *G06F 21/50* | (2013.01) | |
| *G06F 9/54* | (2006.01) | |
| *G06K 9/62* | (2006.01) | |
| *G06Q 30/00* | (2012.01) | |
| *G06N 20/00* | (2019.01) | |
| *G06F 21/60* | (2013.01) | |
| *G06F 21/45* | (2013.01) | |

(52) U.S. Cl.
CPC .............. *G06F 21/50* (2013.01); *G06F 9/547* (2013.01); *G06F 21/45* (2013.01); *G06F 21/604* (2013.01); *G06K 9/6267* (2013.01); *G06N 20/00* (2019.01); *G06Q 30/01* (2013.01)

(58) Field of Classification Search
CPC .......... G06N 20/00; G06F 21/45; G06F 21/50
USPC ....................................................... 726/22
See application file for complete search history.

(56) References Cited

U.S. PATENT DOCUMENTS

| | | | | |
|---|---|---|---|---|
| 9,405,597 | B1 * | 8/2016 | Luff | G06F 9/54 |
| 2016/0294852 | A1 * | 10/2016 | Hagen | H04L 63/1425 |
| 2017/0337094 | A1 * | 11/2017 | Wood | G06F 9/4843 |

* cited by examiner

*Primary Examiner* — Anthony D Brown
(74) *Attorney, Agent, or Firm* — Park, Vaughan, Fleming & Dowler LLP (57) ABSTRACT

The disclosed embodiments relate to a system that detects and controls operations performed by abusive accounts in a customer-relationship-management system. During operation, the system obtains account-related information for an account in the customer-relationship-management system. Next, the system determines a likelihood that the account is being used for abusive purposes based on the account-related information. Finally, the system limits a rate of processing for application-programming interface (API) calls made from the account to the customer-relationship-management system based on the determined likelihood that the account is being used for abusive purposes.

23 Claims, 5 Drawing Sheets

RATE-LIMITING API CALLS FOR AN ACCOUNT IN A CUSTOMER-RELATIONSHIP-MANAGEMENT SYSTEM BASED ON PREDICTED ABUSIVE BEHAVIOR

BACKGROUND

Field

The disclosed embodiments generally relate to the design of customer-relationship-management systems for managing interactions with customers. More specifically, the disclosed embodiments relate to a technique for rate-limiting application-programming interface (API) calls made from an account to a customer-relationship-management system based on a predicted likelihood of abusive behavior by the account.

Related Art

As electronic commerce continues to proliferate, people are beginning to use online customer-relationship-management resources to solve problems, track customer interactions, or to obtain information related to various products or services. These online customer-relationship-management resources commonly include issue-tracking systems, such as "ticketing systems," which help customers track and resolve their problems, either by providing information to the customers, or by facilitating online interactions with customer-support agents. When designed properly, these online customer-relationship-management resources can automate customer-service interactions, thereby significantly reducing a company's service costs.

However, customer-relationship-management resources are sometimes abused for fraudulent purposes. For example, it is possible for an abusive application to cause a ticketing system to create a ticket, which causes a malicious email (or a spam email) to be sent to an unsuspecting recipient. Because this malicious email originates from a legitimate ticketing system, the recipient is less likely to suspect that the email is malicious.

Hence, what is needed is a technique for limiting this type of fraudulent behavior, which is perpetrated by abusive applications through customer-relationship-management resources.

SUMMARY

The disclosed embodiments relate to a system that detects and controls operations performed by abusive accounts in a customer-relationship-management system. During operation, the system obtains account-related information for an account in the customer-relationship-management system. Next, the system determines a likelihood that the account is being used for abusive purposes based on the account-related information. Finally, the system limits a rate of processing for application-programming interface (API) calls made from the account to the customer-relationship-management system based on the determined likelihood that the account is being used for abusive purposes.

In some embodiments, the account-related information for the account includes one or more of the following: operations performed by a user in preparation for setting up the account; and behavior associated with the account over a lifetime of the account, such as the time taken for an account to convert to a paid account. (Note that someone signing up for an account and immediately converting it to a paid account could be construed as suspect if labeled fraudulent accounts also exhibit this behavior.) Note that the system continuously monitors to detect other patterns of behavior associated with the account, such as: account information changes; time to convert to a paid account (an account labeled as abusive often converts to paid account immediately after signup); time to activate trials of products like voice after signup; ticket creation mechanisms (accounts labeled as abusive are likely to create tickets via a helpdesk agent UI or API more commonly, as opposed to generating customer-created tickets); ticket creation activity, such as creating tickets with a larger number of cc: emails (again, accounts labeled as abusive often create tickets with a large number of cc: emails so they can spread email spam widely).

In some embodiments, the account-related information for the account includes one or more of the following: a name of an owner of the account; an email address for the account; a domain name system (DNS) subdomain associated with the account; a name of a company associated with the account;

and a size of the company.

In some embodiments, determining the likelihood that the account is being used for abusive purposes involves considering an edit distance between the DNS subdomain name associated with the account and an email domain name obtained from the email address for the account.

In some embodiments, determining the likelihood that the account is being used for abusive purposes additionally involves considering operational parameters obtained from a data center that processes the API calls made from the account.

In some embodiments, determining the likelihood that the account is being used for abusive purposes involves using a machine-learning model that operates on the account-related information to determine the likelihood.

In some embodiments, prior to obtaining account-related information, the system trains the machine-learning model by: enabling accounts to be marked as abusive when the accounts are cancelled for fraud and abuse-related reasons; enabling accounts to be marked as "good" accounts when the accounts are converted into paid accounts and the accounts were not cancelled for fraud and abuse-related reasons; forming a training data set, which includes both abusive and good accounts; training the machine-learning model using a first portion of the training data set; and testing the trained machine-learning model using a second portion of the training data set.

In some embodiments, determining the likelihood that the account is being used for abusive purposes also involves: using a classification model to classify the account as either good or abusive; and using a regression model to produce a regression score, which indicates the likelihood that the account is being used for abusive purposes. (Note that this determination can be made initially based on account sign-up information, and can also be refined continuously during system operation based on information obtained while monitoring the account.)

In some embodiments, limiting the rate of processing for the API calls made from the account involves one or more of the following: limiting a number of API calls that are processed for the account in a given time interval; disallowing the account to make API calls to the customer-relationship-management system; limiting a number of emails sent by the customer-relationship-management system on behalf of the account; preventing the account from using the customer-service system to generate customized emails or generate help center content; and preventing an owner of the account from creating additional accounts.

In some embodiments, each account can be associated with multiple API tokens, and limiting the rate of processing for the API calls made from the account involves rate-limiting API calls associated with a specific API token associated with the account.

In some embodiments, for each account, the system determines the likelihood that the account is being used for abusive purposes either at periodic intervals, or when specific events occur.

In some embodiments, the customer-relationship-management system includes a ticketing system.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
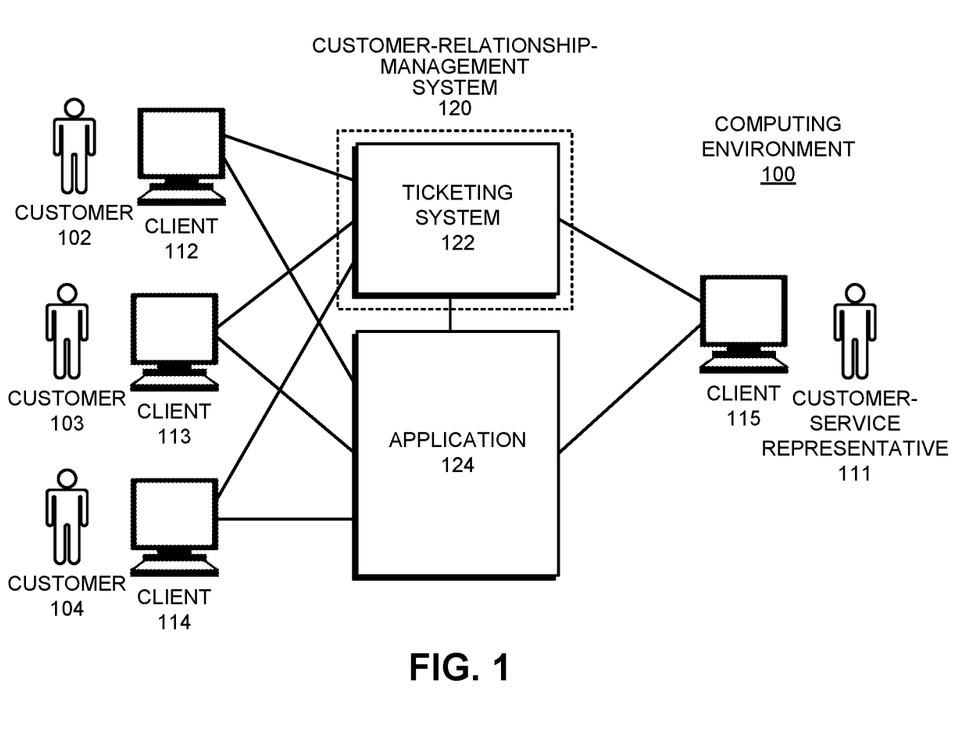
FIG. 1 illustrates a computing environment including an application and associated customer-relationship-management system in accordance with the disclosed embodiments.

FIG. 1 illustrates a computing environment 100 including an application 124 and ticketing system 122 in accordance with the disclosed embodiments. Within computing environment 100, a number of customers 102-104 interact with application 124 through client computer systems 112-114, respectively. Application 124 is provided by an organization, such as a commercial enterprise, to enable customers 102-104 to perform various operations associated with the organization, or to access one or more services provided by the organization. For example, application 124 can include online accounting software that customers 102-104 can access to prepare and file tax returns online. In another example, application 124 provides a commercial website for selling sporting equipment. Note that application 124 can be hosted on a local or remote server.

If customers 102-104 have problems or questions about application 124, they can access a customer-relationship-management system 120 to obtain help in dealing with issues, which can include various problems and questions. (In general, customer-relationship-management system 120 can include any type of system that facilitates: customer-support operations, messaging operations, operations associated with a chat system, operations for tracking customer behavior, and operations that support product marketing efforts. It can also include Software-as-a-Service (SaaS) systems.) For example, a user of accounting software may need help in using a feature of the accounting software, or a customer of a website that sells sporting equipment may need help in cancelling an order that was erroneously entered. This help may be provided by a customer-service representative 111 who operates a client computer system 115 and interacts with customers 102-104 through customer-relationship-management system 120. This help may also comprise automatically suggested helpful articles that the customer can read to hopefully resolve the problem or question. Note that customer-service representative 111 can access application 124 (either directly or indirectly through customer-relationship-management system 120) to help resolve an issue.

In some embodiments, customer-relationship-management system 120 is not associated with computer-based application 124, but is instead associated with another type of product or service that is offered to a customer. For example, customer-relationship-management system 120 can provide assistance with a product, such as a television, or with a service such as a package-delivery service.

Customer-relationship-management system 120 organizes customer issues using a ticketing system 122, which generates tickets to represent each customer issue. Ticketing systems are typically associated with a physical or virtual "help desk" for resolving customer problems. Note that although the present invention is described with reference to a ticketing system, it is not meant to be limited to customer-service interactions involving ticketing systems. In general, the invention can be applied to any type of system that enables a customer to resolve a problem with a product or service provided by an organization.

Ticketing system 122 comprises a set of software resources that enable a customer to resolve an issue. In the illustrated embodiment, specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-service agents who are interacting with the customer; (4) email and other electronic communications about the problem (which, for example, can include a question posed by a customer about the problem); (5) information about telephone calls associated with the problem; (6) timeline information associated with customer-service interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-service agent.

Note that customer-relationship-management system 120 can possibly be abused to generate spam emails. For example, a spammer can spoof a requester's address and create a ticket with a spam content, which causes a notification to be sent to the spoofed address whose owner never requested the ticket in the first place. More specifically, the spammer can first create an account on customer-relationship-management system 120, and can then create any number of tickets with abusive content. Because the spammer is creating the tickets within the spammer's own account, the spammer can add any number of users, which leads the creation of associated tickets with abusive content. The victims that the spammers add as ticket requesters will subsequently receive spam emails as notification emails associated with the ticket creation. Customer support system 120 can also be abused by spammers signing up for accounts that look like well-known brands and impersonating those brands to conduct social engineering attacks.

Rate-Limiting Mechanisms

Figure 2:
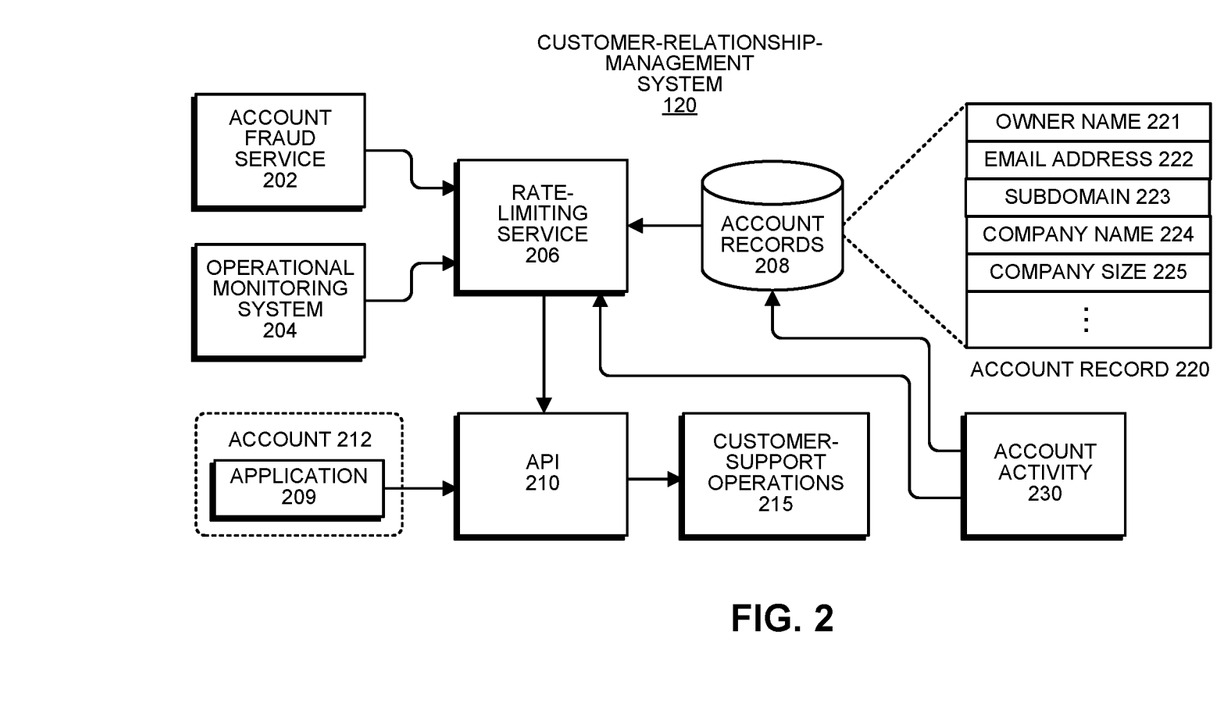
FIG. 2 illustrates rate-limiting mechanisms within the customer-relationship-management system illustrated in FIG. 1 in accordance with the disclosed embodiments.

FIG. 2 illustrates various components that facilitate API rate-limiting within the customer-relationship-management system 120 illustrated in FIG. 1 in accordance with the disclosed embodiments. These components include an account fraud service (AFS) 202, which identifies accounts that are likely to be used for fraudulent or abusive purposes. It also includes an operation monitoring system (OPS) 204, which obtains operational parameters from a data center that processes the API calls. These operational parameters can, for example, indicate the overall health of the data center and the usage of a specific API by a specific account. The components additionally include an account-records database 208, which holds account records and other information for the accounts in customer-relationship-management system 120. (Note that these account records are continually updated based on ongoing account activity 230 to reflect account changes that take place over the lifetime of the account.) For example, as illustrated in FIG. 2, an exemplary account record 220 can include account-related parameters, such as: a name of an owner of the account 221; an email address for the account 222; a domain name system (DNS) subdomain associated with the account 223; a name of a company associated with the account 224; and a size of the company 225.

Various parameters from AFS 202 and OPS 204 along with account information from account-record database 208, and also ongoing account activity 230 (which reflects account changes that take place over the lifetime of the account) feed into a rate-limiting service 206, which determines whether an account 212 is being used for fraudulent or abusive purposes. If so, rate-limiting service 206 causes an API 210, which provides various customer-relationship-management operations 215 within customer-relationship-management system 120, to limit a number of API calls that are processed for a given application 209 that is operating within account 212 during a given time interval. (Note that application 209 can make calls through API 210 to perform various operations, such as: creating additional accounts; creating tickets; adding new users; deleting existing users; creating help center articles; and commenting on existing tickets.) If the determined risk is sufficiently high, the system can completely disallow application 209 from making API calls. Note that rate-limiting service 206 can also take other actions, such as limiting a number of emails sent by the customer-relationship-management system on behalf of the account, and preventing the account from using customer-service system 120 to: generate customized emails; create help center articles; or create additional accounts.

Training Process

Figure 3:
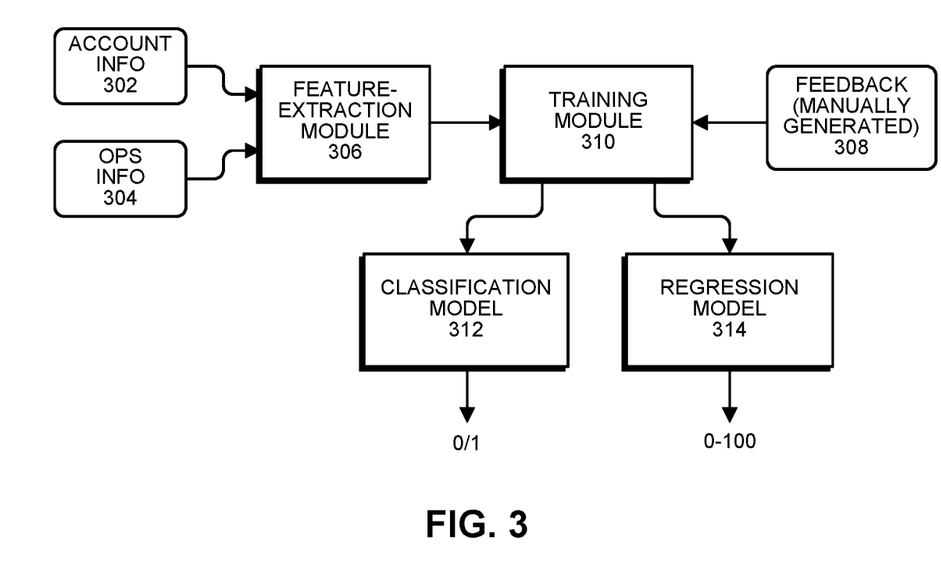
FIG. 3 presents a block diagram of the training process in accordance with the disclosed embodiments.

FIG. 3 presents a block diagram of a training process that trains the system to recognize potentially abusive accounts in accordance with the disclosed embodiments. More specifically, FIG. 3 illustrates a number of components within rate-limiting service 206 illustrated in FIG. 2, including a feature-extraction module 306, a training module 310, a classification model 312 and a regression model 314.

During the training process, feature-extraction module 306 receives account information 302 from account record database 208 illustrated in FIG. 2, and also receives OPS information 304 from OPS 204 also illustrated in FIG. 2. Feature-extraction module 306 uses these inputs to generate various "features" that feed into training module 310. For example, these features can include: (1) any parameter contained in the account record for the account; for example, see account record 220 illustrated in FIG. 2; (2) an IP address associated with the account; (3) operations performed by a user in preparation for setting up the account; note that a legitimate user is likely to browse the information on the website before setting up an account, whereas a fraudulent user is unlikely to do so; (4) whether the email address is associated with a valid email domain; (5) whether the subdomain name ends in numerical digits; (6) a total number of accounts that are associated with a specific email address; (7) whether the account (or attributes of the account) appears on a blacklist; and (8) whether the subdomain name includes "gibberish" text, which was likely to have been automatically generated by malicious software. Training module 310 also receives feedback 308, which can be manually generated, about whether specific accounts are used for fraudulent purposes or other abusive purposes.

Note that feedback 308 can also be received from a third-party system. For example, suppose that a third-party email system implements the Domain-based Message Authentication, Reporting and Conformance (DMARC) standard in a manner that provides reports for subdomains of the email system. This enables the third-party system to provide feedback indicating that a specific account associated with a specific subdomain is generating abusive emails.

During operation, training module 310 uses inputs 302 and 304 along with feedback 308 to train both a classification model 312 and a regression module 314 to determine whether accounts are being used for fraudulent and other abusive purposes. Classification model 312 produces a zero or one output, indicating whether a specific account is classified as an abusive account or a good account, whereas repression model 314 generates a regression score (from 0 to 100), which indicates a relative likelihood that the account is being used for abusive purposes.

If the account is being used for abusive purposes, rate-liming service 206 causes API 210 to limit the operations that can be performed by these accounts. (See FIG. 2.) For example, an account can be limited by: (1) limiting a number of API calls that are processed for the account in a given time interval; (2) disallowing the account to make API calls to the customer-relationship-management system; (3) limiting a number of emails sent by the customer-relationship-management system on behalf of the account; and (4) preventing the account from using the customer-service system to generate customized emails; this prevents "phishing" attacks wherein an abusive application generates a customized email that appears to originate from a legitimate company.

Note that the amount of rate-limiting for API calls can be scaled in proportion to the perceived risk. For example, if the regression score for an account is 0-30, the system can rate-limit with a maximum rate of $r_1$. If the regression score is 30-60, the system can rate-limit with a maximum rate of $r_2$, wherein $r_2 < r_1$. If the regression score is 60-90, the system can rate-limit with a maximum rate of $r_3$, wherein $r_3 < r_2$. Finally, if the regression score is over 90, the system can completely disallow the account from making API calls.

The rate-limiting process can also be narrowed to specific API tokens. Note that each account can possibly be associated with multiple API tokens, which can be used by various applications or associated with the account. In this case, the rate-limiting can be applied only to API calls associated with a specific API token for the account.

The system can also be used to prevent accidental abuse by legitimate accounts. For example, suppose a customer executes a new version of an application that includes erroneous code, which causes the customer-relationship-management system to perform abusive actions. In this case, the rate-limiting mechanism can be used to lessen the impact of this accidental abuse by erroneous code.

Figure 5:
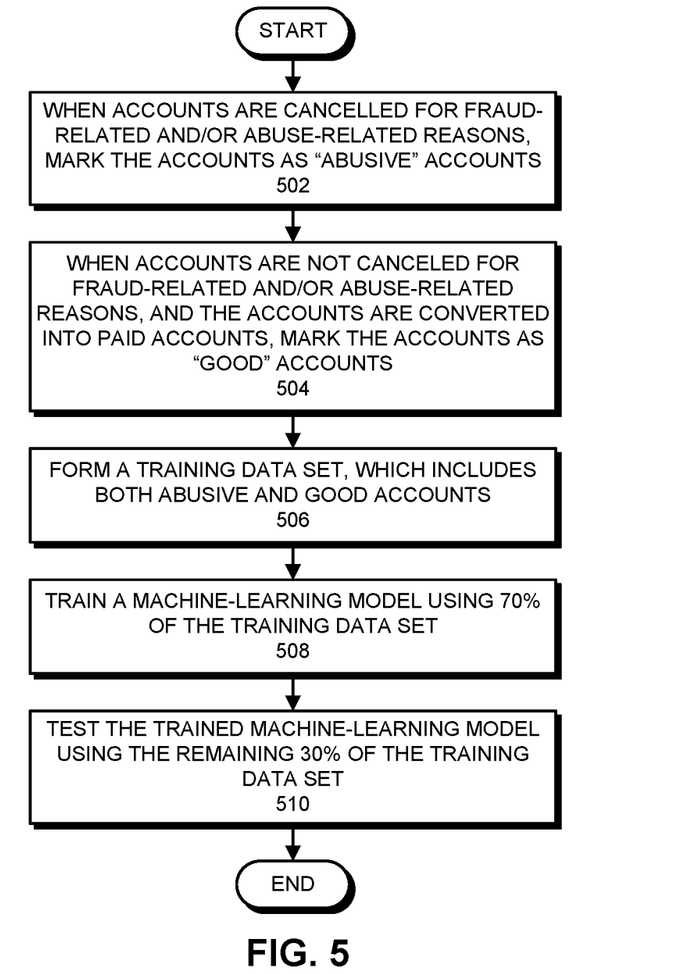
FIG. 5 presents a flow chart illustrating how the machine-learning model is trained to recognize abusive accounts in accordance with the disclosed embodiments.

In summary, FIG. 5 presents a flowchart illustrating how the machine-learning model is trained to recognize abusive accounts in accordance with the disclosed embodiments. First, when accounts are cancelled for fraud and/or abuse-related reasons, the system marks the accounts as "abusive" accounts (step 502). In contrast, when accounts are not cancelled for fraud-related and abuse-related reasons, and the accounts are converted into paid accounts, the system marks the accounts as "good" accounts (step 504). Next, the system forms a training data set, which includes both abusive and good accounts (step 506). The system then trains the machine-learning model using (for example) 70% of the training data set (step 508). Finally, the system tests the trained machine-learning model using the remaining 30% of the training data set (step 510).

Detecting and Rate-Limiting Abusive Accounts

Figure 4:
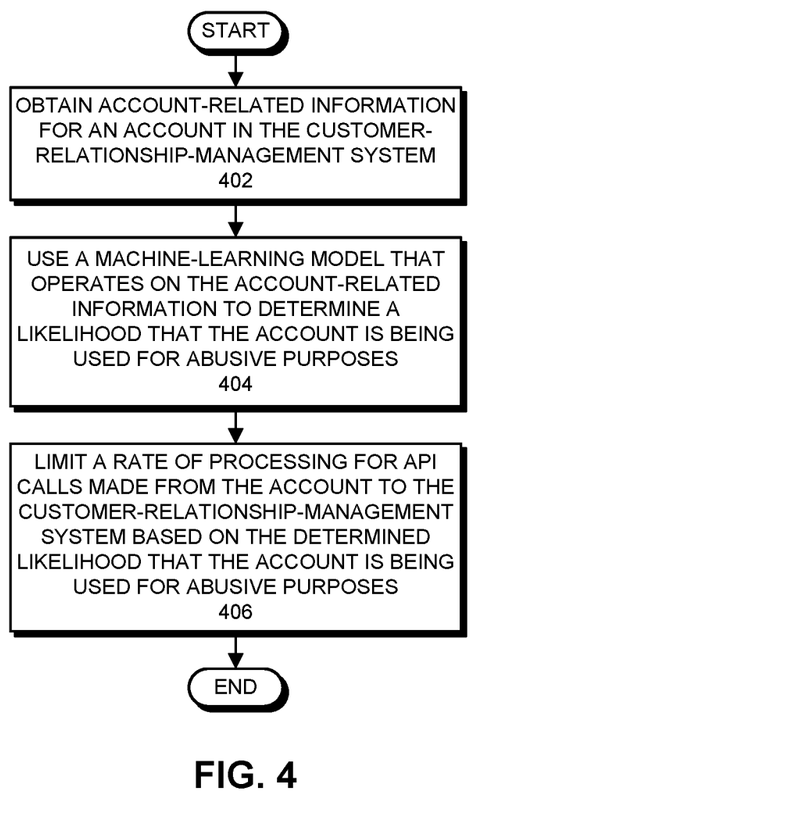
FIG. 4 presents a flow chart illustrating how the system identifies and rate-limits abusive accounts in accordance with the disclosed embodiments.

FIG. 4 presents a flow chart illustrating how abusive accounts are identified and rate-limited in accordance with the disclosed embodiments. During operation, the system obtains account-related information for an account in the customer-relationship-management system (step 402). Next, the system uses a machine-learning model that operates on the account-related information to determine a likelihood that the account is being used for abusive purposes based on the account-related information (step 404). (Note that the likelihood of abusive behavior can be determined either at periodic intervals, or when specific events occur, such as: when an account is first created; when additional users are added to the account; or when payment information is added to an account.) Finally, the system limits a rate of processing for application-programming interface (API) calls made from the account to the customer-relationship-management system based on the determined likelihood that the account is being used for abusive purposes (step 406).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting and controlling operations performed by abusive accounts in a customer-relationship-management system, comprising:
   obtaining account-related information for an account in the customer-relationship-management system;
   determining a likelihood that the account is being used for intentionally abusive purposes based on the account-related information by:
      using a classification model to classify the account as either good or abusive, and
      using a regression model to produce a regression score, which indicates the likelihood that the account is being used for intentionally abusive purposes; and
   limiting a rate of processing for application-programming interface (API) calls made from the account to the customer-relationship-management system based on the determined likelihood that the account is being used for intentionally abusive purposes, wherein the API is executing on a processor on the customer-relationship-management system.

2. The method of claim 1, wherein the account-related information for the account includes one or more of the following:
   operations performed by a user in preparation for setting up the account; and
   behavior associated with the account over a lifetime of the account.

3. The method of claim 1, wherein the account-related information for the account includes one or more of the following:
   a name of an owner of the account;
   an email address for the account;
   a domain name system (DNS) subdomain associated with the account;
   a name of a company associated with the account; and
   a size of the company.

4. The method of claim 3, wherein determining the likelihood that the account is being used for intentionally abusive purposes involves considering an edit distance between the DNS subdomain name associated with the account and an email domain name obtained from the email address for the account.

5. The method of claim 1, wherein determining the likelihood that the account is being used for intentionally abusive purposes additionally involves considering operational parameters obtained from a data center that processes the API calls made from the account.

6. The method of claim 1, wherein determining the likelihood that the account is being used for intentionally abusive purposes involves using a machine-learning model that operates on the account-related information to determine the likelihood.

7. The method of claim 6, wherein prior to obtaining account-related information, the method further comprises training the machine-learning model by:
  enabling accounts to be marked as abusive when the accounts are cancelled for fraud and abuse-related reasons;
  enabling accounts to be marked as good accounts when the accounts are converted into paid accounts and the accounts were not cancelled for fraud and abuse-related reasons;
  forming a training data set, which includes both abusive and good accounts;
  training the machine-learning model using a first portion of the training data set; and
  testing the trained machine-learning model using a second portion of the training data set.

8. The method of claim 1, wherein limiting the rate of processing for the API calls made from the account involves one or more of the following:
  limiting a number of API calls that are processed for the account in a given time interval;
  disallowing the account to make API calls to the customer-relationship-management system;
  limiting a number of emails sent by the customer-relationship-management system on behalf of the account;
  preventing the account from using the customer-service system to generate customized emails;
  preventing the account from using the customer-service system to generate help center content; and
  preventing an owner of the account from creating additional accounts.

9. The method of claim 1,
  wherein each account can be associated with multiple API tokens; and
  wherein limiting the rate of processing for the API calls made from the account involves rate-limiting API calls associated with a specific API token associated with the account.

10. The method of claim 1, wherein for each account, the method determines the likelihood that the account is being used for intentionally abusive purposes either at periodic intervals, or when specific events occur.

11. The method of claim 1, wherein the customer-relationship-management system includes a ticketing system.

12. A non-transitory computer-readable storage medium storing instructions that when executed by a computer cause the computer to perform a method for detecting and controlling operations performed by abusive accounts in a customer-relationship-management system, the method comprising:
  obtaining account-related information for an account in the customer-relationship-management system;
  determining a likelihood that the account is being used for intentionally abusive purposes based on the account-related information by:
    using a classification model to classify the account as either good or abusive, and
    using a regression model to produce a regression score, which indicates the likelihood that the account is being used for intentionally abusive purposes; and
  limiting a rate of processing for application-programming interface (API) calls made from the account to the customer-relationship-management system based on the determined likelihood that the account is being used for intentionally abusive purposes.

13. The non-transitory computer-readable storage medium of claim 12, wherein the account-related information for the account includes one or more of the following:
  operations performed by a user in preparation for setting up the account; and
  behavior associated with the account over a lifetime of the account.

14. The non-transitory computer-readable storage medium of claim 12, wherein the account-related information for the account includes one or more of the following:
  a name of an owner of the account;
  an email address for the account;
  a domain name system (DNS) subdomain associated with the account;
  a name of a company associated with the account; and
  a size of the company.

15. The non-transitory computer-readable storage medium of claim 14, wherein determining the likelihood that the account is being used for intentionally abusive purposes involves considering an edit distance between the DNS subdomain name associated with the account and an email domain name obtained from the email address for the account.

16. The non-transitory computer-readable storage medium of claim 12, wherein determining the likelihood that the account is being used for intentionally abusive purposes additionally involves considering operational parameters obtained from a data center that processes the API calls made from the account.

17. The non-transitory computer-readable storage medium of claim 12, wherein determining the likelihood that the account is being used for intentionally abusive purposes involves using a machine-learning model that operates on the account-related information to determine the likelihood.

18. The non-transitory computer-readable storage medium of claim 17, wherein prior to obtaining account-related information, the method further comprises training the machine-learning model by:
  enabling accounts to be marked as abusive when the accounts are cancelled for fraud and abuse-related reasons;
  enabling accounts to be marked as good accounts when the accounts are converted into paid accounts and the accounts were not cancelled for fraud and abuse-related reasons;
  forming a training data set, which includes both abusive and good accounts;
  training the machine-learning model using a first portion of the training data set; and
  testing the trained machine-learning model using a second portion of the training data set.

19. The non-transitory computer-readable storage medium of claim 12, wherein limiting the rate of processing for the API calls made from the account involves one or more of the following:
- limiting a number of API calls that are processed for the account in a given time interval;
- disallowing the account to make API calls to the customer-relationship-management system;
- limiting a number of emails sent by the customer-relationship-management system on behalf of the account;
- preventing the account from using the customer-service system to generate customized emails;
- preventing the account from using the customer-service system to generate customized emails;
- preventing the account from using the customer-service system to generate help center content; and
- preventing an owner of the account from creating additional accounts.

20. The non-transitory computer-readable storage medium of claim 12,
- wherein each account can be associated with multiple API tokens; and
- wherein limiting the rate of processing for the API calls made from the account involves rate-limiting API calls associated with a specific API token associated with the account.

21. The non-transitory computer-readable storage medium of claim 12, wherein for each account, the method determines the likelihood that the account is being used for intentionally abusive purposes either at periodic intervals, or when specific events occur.

22. The non-transitory computer-readable storage medium of claim 12, wherein the customer-relationship-management system includes a ticketing system.

23. A system that detects and controls operations performed by abusive accounts in a customer-relationship-management system, comprising:
- at least one processor and at least one associated memory; and
- a customer-relationship-management system that executes on the at least one processor and includes a rate-limiting mechanism, wherein during operation, the rate-limiting mechanism:
  - obtains account-related information for an account in the customer-relationship-management system;
  - determines a likelihood that the account is being used for intentionally abusive purposes based on the account-related information by:
    - using a classification model to classify the account as either good or abusive, and
    - using a regression model to produce a regression score, which indicates the likelihood that the account is being used for intentionally abusive purposes; and
  - limits a rate of processing for application-programming interface (API) calls made from the account to the customer-relationship-management system based on the determined likelihood that the account is being used for intentionally abusive purposes.

\* \* \* \* \*